Patented Jan. 1, 1946

2,391,886

UNITED STATES PATENT OFFICE 2,391,886

MONOAZO TETRAHYDROQUINOLINE COMPOUNDS

Joseph B. Dickey and James G. McNally, Rochester, N. Y., assignors to Eastman Kodak Company, Rochester, N. Y., a corporation of New Jersey No Drawing. Application July 21, 1941,
Serial No. 403,358

6 Claims. (Cl. 260—155)

This invention relates to new azo compounds and their application to the art of dyeing or coloring. Textile materials such as organic derivatives of cellulose, wool, silk, nylon, and Vinyon and lacquers composed of cellulose esters, cellulose ethers and vinyl derivatives, for example, can be colored. Coloration can be effected by dyeing, printing, stencilling, or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies equally to the coloration of the other materials just mentioned.

It is an object of our invention to provide a new class of azo compounds. Another object is to provide a process for the dyeing or coloration of various textile materials including organic derivative of cellulose, wool, silk, nylon and Vinyon textile materials. A further object is to provide dyed textile materials which are of good fastness to light and washing and which can be readily discharged. A still further object is to provide dye compounds having improved dyeing properties as regards levelness and speed of dyeing at relatively low temperatures.

The azo compounds of our invention by means of which the above objects are accomplished or made possible, consist of azo compounds having the formulas:

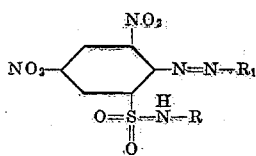

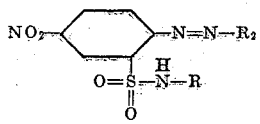

and

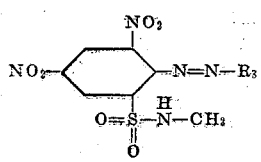

wherein R stands for a low carbon alkyl group, a low carbon hydroxylalkyl group, a low carbon alkoxyalkyl group or a low carbon alkenyl group. $R_1$ stands for the residue of a 1-alkyl-2-alkyl tetrahydroquinoline, $R_2$ stands for the residue of a member selected from the group consisting of a 1-alkyl-2-alkyl tetrahydroquinoline, 1-hydroxyalkyl-2-hydroxyalkyl tetrahydroquinoline and a 1-alkyl-2-alkyl phenmorpholine, and $R_3$ stands for the residue of a 1-hydroxyalkyl tetrahydroquinoline, said tetrahydroquinoline and phenmorpholine nuclei being joined through the carbon atom in their 6-positions to the azo linkage.

While our invention relates broadly to the azo compounds having the above formulas, it relates more particularly to the azo compounds having the formulas:

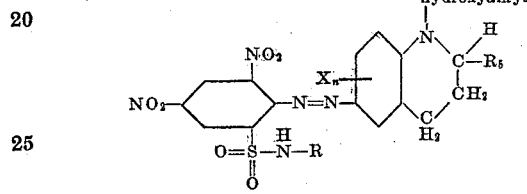

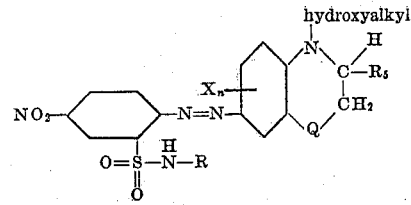

and

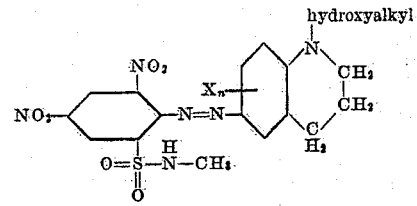

wherein R stands for a low carbon alkyl group, $R_5$ stands for a low carbon alkyl hydrocarbon group, Q stands for a member selected from the group consisting of O and $CH_2$, X stands for a member selected from the group consisting of an alkyl group, an alkoxy group and a halogen atom and $n$ stands for a member selected from the group consisting of 0, 1, 2, and 3.

For purposes of clarity, it is here noted that the alkyl group attached to the nitrogen atom forming a part of the tetrahydroquinoline and phenmorpholine nuclei which $R_1$ and $R_2$ represent is ordinarily an alkyl group such as methyl, ethyl, propyl and butyl or a hydroxyalkyl group, such as β-hydroxyethyl, β-hydroxypropyl, β,γ- dihydroxypropyl, γ-hydroxypropyl, δ-hydroxybutyl, β-methyl-β,γ-dihydroxypropyl and pentaerythrityl, for example. R₁ and R₂ may also be β-sulfoethyl or β-sulfatoethyl. Similarly, the hydroxyalkyl group present in the 1-position of the tetrahydroquinoline nucleus represented by R₃ is ordinarily a hydroxyalkyl group such as β-hydroxyethyl, β,γ-dihydroxypropyl, γ-hydroxypropyl, δ-hydroxybutyl, pentaerythrityl, or β-methyl-β,γ-dihydroxypropyl. The low carbon group represented by R is usually methyl, ethyl, propyl, butyl, β-hydroxyethyl, β-methoxyethyl or β-ethoxyethyl. The low carbon group in this instance is also intended to include the allyl radical.

Compounds wherein the alkyl group in the 2-position of the phenmorpholine and tetrahydroquinoline nuclei represented by R₁ and R₂ is methyl appear to be particularly advantageous. Likewise compounds wherein the alkyl group in the 1-position of said nuclei is a hydroxyalkyl group appear to be generally advantageous and of these β,γ-dihydroxypropyl and β-methyl-β,γ-dihydroxypropyl seem most advantageous. Similarly the presence of a methyl group in the 7-position appears to be advantageous as is the case when R is methyl or ethyl.

In the interest of clarity it is here noted that the tetrahydroquinoline and phenmorpholine nuclei are numbered as indicated hereinafter.

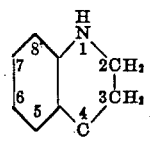

Tetrahydroquinoline

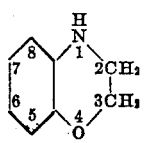

Phenmorpholine

The azo compounds of our invention constitute valuable dyes for the coloration of the materials hereinbefore named, especially for the coloration of cellulose acetate and nylon. For the coloration of organic derivative of cellulose textile materials, nuclear non-sulfonated compounds should be employed, and it is to such compounds that our invention is more particularly directed. These compounds likewise can be used to color the other materials named herein. Nuclear sulfonated compounds of the invention, which can be prepared by sulfonation of the unsulfonated compounds, possess little or no utility for the coloration of organic derivative of cellulose textile materials but can be used to color wool and silk.

As a general rule the dye compounds of our invention yield dyeings, particularly on cellulose acetate silk and nylon, which are of good to excellent light fastness. In the case of those compounds prepared from diazotized 2-amino-3,5-dinitrobenzenesulfonemethylamide and a 1-hydroxyalkyl tetrahydroquinoline we have observed that they possess improved dyeing properties as regards levelness and speed of dyeing at lower temperatures over the corresponding compounds wherein the methyl group is replaced by a higher alkyl group. Further, since the dye compounds of our invention yield light fast violet shades which are dischargeable, they are of considerable technical importance because azo dye compounds having such properties, so far as we are aware, have not been available.

The azo dye compounds of our invention can be prepared by diazotizing 2-amino-5-nitrobenzene sulfonealkylamide and 2-amino-3,5-dinitrobenzenesulfonealkylamide compounds and coupling the diazonium compounds obtained with the tetrahydroquinoline and phenmorpholine compounds indicated hereinbefore.

The following examples illustrate the preparation of the azo compounds of our invention:

*Example 1*

One gram mole of 2-amino-3,5-dinitrobenzenesulfonemethylamide is diazotized in a mixture of acetic and propionic acids (6:1) at about 6–9° C. by means of nitrosyl sulfuric acid. When diazotization is complete (about 1.5 hours), the reaction mixture is poured onto ice, and the yellow diazonium compound that separates is filtered on a Büchner and washed with water containing urea or sulfamic acid until free of nitrous and sulfuric acids. The diazonium compound thus obtained is then added to a cold acetic acid solution of 1-β,γ-dihydroxypropyl-2,7-dimethyltetrahydroquinoline, and the reaction mixture is allowed to stand overnight. The resulting blue solution is poured into a mixture of ice and water, filtered, and the precipitate recovered is washed with water and dried. The dye compound obtained colors cellulose acetate silk blue, and the dyeing obtained is fast to light and burnt gas fumes and can be discharged white.

One gram mole of β-methyl-β,γ-dihydroxypropyl-2,7-dimethyltetrahydroquinoline can be substituted for the coupling component of the above example to obtain a dye which has substantially the same properties as the dye above obtained.

*Example 2*

One gram mole of 2-amino-3,5-dinitrobenzenesulfone-ethylamide is diazotized, and the diazonium compound obtained is coupled with one gram mole of 1-β,γ-dihydroxypropyl-2,7-dimethyltetrahydroquinoline. Diazotization, coupling, and recovery of the dye compound formed can be carried out in accordance with the procedure described in Example 1. The dye compound obtained colors cellulose acetate silk blue shades which have the desirable properties given in Example 1.

An equivalent amount of 1-β,γ-dihydroxypropyl-2,5-dimethyltetrahydroquinoline can be substituted in the above example to obtain a dye which yields colorations which are slightly greener than those obtained with the dye above described and which has the desirable properties mentioned in Example 1.

*Example 3*

One gram mole of 2-amino-3,5-dinitrobenzenesulfone-β-hydroxyethylamide in fine powder form are thoroughly mixed with 122 grams of Na₂S₂O₅ (sodium metabisulfite) to give a uniform mixture. This mixture is added portion-wise with stirring to 750 cc. of fuming nitric acid cooled to 0° C. The temperature is maintained between 0° and 7° C. during the course of the addition which requires 45 minutes. Fifty cc. of fuming nitric acid are then added to wash down any amide, and the solution is stirred for 10 minutes at 4–5° C. while 36 grams of dry sodium nitrite are added over a period of about one minute. Stirring is continued at 0–5° C. for one hour, and then the diazonium solution is poured into 13 liters of ice and water while stirring, and the yellow diazonium precipitate is recovered by filtration and washed with water. The diazonium compound is freed of nitrous acid by treatment with water containing urea.

The diazonium compound obtained is added to an equivalent gram molecular weight of 1-$\beta,\gamma$-dihydroxypropyl - 2,7- diethyltetrahydroquinoline dissolved in 2.6 liters of acetic acid cooled to just about the freezing point. Upon completion of the coupling reaction which takes place (20 hours), the reaction mixture is poured into 50 liters of ice water, and the precipitated dye is recovered by filtration, washed with water, and dried. The dye compound obtained colors cellulose acetate silk blue shades which are fast to burnt gas fumes and light and which are easily dischargeable to white.

Example 4

One gram mole of 2-amino-5-nitrobenzenesulfoneethylamide is diazotized in a mixture of nitrosyl sulfuric and acetic acids. Upon completion of the diazotization reaction, the diazonium solution is poured into water, and the yellow diazonium solid that separates is recovered by filtration and washed free of mineral acid.

The diazonium compound obtained above is then added to an acetic acid solution of one gram mole of 1-$\beta,\gamma$-dihydroxypropyl-2-methyltetrahydroquinoline. Upon completion of the coupling reaction which takes place, water is added to the reaction mixture, and the precipitated dye compound is recovered by filtration, washed with water, and dried. Cellulose acetate silk is colored a reddish-violet shade which has excellent light fastness properties and is easily dischargeable to white.

A particularly valuable violet dye is obtained if 1-$\beta,\gamma$-dihydroxypropyl - 2,7 - dimethyltetrahydroquinoline is substituted for the coupling component of the above example.

Example 5

One gram mole of 2-amino-5-nitrobenzenesulfone-$\beta$-methoxyethylamide is diazotized, and the diazonium compound obtained is coupled with one gram mole of 1-$\beta$-hydroxypropyl-2,7-dimethylphenmorpholine. The dye compound obtained colors cellulose acetate silk and the other textile materials named hereinbefore violet shades which are very fast to light.

Example 6

One gram mole of 2-amino-5-nitrobenzenesulfoneallylamide is diazotized, and the diazonium compound obtained is coupled with one gram mole of 1-$\beta$-sulfatoethylphenmorpholine. The dye compound obtained colors the textile materials previously named pinkish-rubine shades.

Example 7

One gram mole of 2-amino-3,5-dinitrobenzenesulfonemethylamide is diazotized as previously described, and the diazonium compound obtained is added in the cold to an acetic acid solution of 1-$\beta,\gamma$-dihydroxypropyl - 7 - methyltetrahydroquinoline (this compound contains about 20% of 5-methyl isomer) and allowed to stand over night to couple. The reaction mixture is then poured onto ice, and the precipitated dye is recovered by filtration, washed free of acid, and dried. The dye compound yields blue shades on the materials named hereinbefore and dyes cellulose ester fibers very evenly.

One gram mole of $\beta$-methyl-$\beta,\gamma$-dihydroxypropyl-7-methyltetrahydroquinoline can be substituted in the above reaction to obtain a dye which colors the textile materials named herein level blue shades of excellent fastness to light, washing, and burnt gas fumes.

The following tabulation further illustrates the compounds included within the scope of our invention together with the color they produce on the textile materials named hereinbefore. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 7, inclusive.

| Amine | Coupling component | Color |
| --- | --- | --- |
| (1) 2-amino-3,5-dinitrobenzenesulfonmethylamide | 1-$\beta,\gamma$-dihydroxypropyl-2-methyltetrahydroquinoline | Reddish-blue. |
| (2) 2-amino-3,5-dinitrobenzenesulfonethylamide | ----do---- | Do. |
| (3) 2-amino-3,5-dinitrobenzenesulfon-$\beta$-hydroxyethylamide | ----do---- | Do. |
| (4) 2-amino-3,5-dinitrobenzenesulfon-$\beta$-methoxyethylamide | ----do---- | Do. |
| (5) 2-amino-3,5-dinitrobenzenesulfon-$\beta$-hydroxypropylamide | ----do---- | Do. |
| (6) 2-amino-3,5-dinitrobenzenesulfonpropylamide (n and iso). | ----do---- | Do. |
| 1–6 above | 1-$\beta$-hydroxyethyl-2-methyltetrahydroquinoline | Do. |
| Do | 1-$\beta$-methyl-$\beta,\gamma$-dihydroxypropyl-2-methyltetrahydroquinoline. | Do. |
| Do | 1-$\beta,\gamma$-dihydroxy-propyl-2-ethyltetrahydroquinoline | Do. |
| Do | 1-$\beta,\gamma$-dihydroxypropyl-2,7-dimethyltetrahydroquinoline | Blue. |
| Do | 1-$\beta,\gamma$-dihydroxypropyl-2-methyl-5-ethyltetrahydroquinoline | Do. |
| Do | 1-$\beta,\gamma$-dihydroxypropyl-2-methyl-7-methoxytetrahydroquinoline. | Do. |
| Do | 1-$\beta,\gamma$-dihydroxypropyl-2-methyl-8-methoxytetrahydroquinoline. | Greenish-blue. |
| Do | 1-$\beta,\gamma$-dihydroxypropyl-2-methyl-8-ethoxytetrahydroquinoline. | Do. |
| Do | 1-$\beta,\gamma$-dihydroxypropyl-2-$\beta$-hydroxyethyl-7-chloro-tetrahydroquinoline. | Violet. |
| Do | 1-$\beta$-hydroxyethyl-2-propyl-7-bromotetrahydroquinoline | Do. |
| Do | 1-$\gamma$-hydroxypropyl-2-methyl-5-methoxytetrahydroquinoline. | Blue. |
| 2-amino-3,5-dinitrobenzenesulfonmethylamide | 1-$\beta,\gamma$-dihydroxypropyltetra-hydroquinoline | Reddish-blue. |
| Do | 1-pentaerythrityltetra-hydroquinoline | Do. |
| Do | 1-$\beta$-methyl-$\beta,\gamma$-dihydroxy-propyltetrahydroquinoline | Do. |
| Do | 1-$\beta,\gamma$-dihydroxypropyl-7-methoxytetrahydroquinoline | Blue. |
| Do | 1-$\beta,\gamma$-dihydroxypropyl-7-chlorotetrahydroquinoline | Violet. |
| Do | 1-$\beta$-methyl-$\beta,\gamma$-dihydroxy-propyl-7-methyltetrahydroquinoline. | Blue. |
| Do | 1-$\beta$-hydroxyethyl-7-bromo-tetrahydroquinoline | Violet. |

| Amine | Coupling component | Color |
|---|---|---|
| 2-amino-5-nitro-benzenesulfonmethylamide | (1) 1-β-hydroxyethyl-2-methyl-tetrahydroquinoline | Reddish-violet. |
| Do | (2) 1-β,γ-dihydroxypropyl-2-methylphenmorpholine | Do. |
| Do | (3) 1-β,γ-dihydroxypropyl-2,7-dimethylphenmorpholine | Violet. |
| Do | (4) 1-β,γ-dihydroxypropyl-2,5-dimethylphenmorpholine | Do. |
| Do | (5) 1-β,γ-dihydroxypropyl-7-methylphenmorpholine | Do. |
| Do | (6) 1-β-hydroxyethyl-7-methoxyphenmorpholine | Do. |
| Do | (7) 1-β-hydroxypropyl-7-chlorophenmorpholine | Rubine. |
| Do | (8) 1-β,γ-dihydroxypropyl-2-methyl-8-methoxytetrahydroquinoline. | Violet. |
| Do | (9) 1-β,γ-dihydroxypropyl-2-methyl-7-ethyltetrahydroquinoline. | Do. |
| 2-amino-5-nitro-benzenesulfonethylamide | 1-9 above | Reddish-violet to violet. |
| 2-amino-5-nitro-benzenesulfon-β-methoxyethylamide | do | Do. |
| 2-amino-5-nitro-benzenesulfonethylamide | do | Do. |
| 2-amino-5-nitro-benzenesulfonallylamide | do | Do. |

It will be understood that the examples given are intended to be illustrative and not limitative of our invention. Thus, within the teachings of the invention, any of the diazonium compounds disclosed herein can be coupled with any of the coupling components indicated herein to obtain dye compounds of our invention.

The tetrahydroquinoline coupling compounds employed in the preparation of the azo compounds of our invention can be prepared by hydrogenating the corresponding quinoline compounds, unsubstituted in the ring nitrogen atom, and then introducing the alkyl substituent present on the ring nitrogen atom by methods known to the art for their introduction. The examples given hereinafter are illustrative of the hydrogenation and alkylation reactions employed.

HYDROGENATION

*Preparation of 2-methyl tetrahydroquinoline*

One gram mole of 2-methyl quinoline is reacted with hydrogen at a temperature of about 90° C. in the presence of 10 grams of a finely divided nickel catalyst such as Raney nickel under a hydrogen pressure of about 1500 pounds per square inch. Upon completion of the reaction, the 2-methyl tetrahydroquinoline formed is recovered, for example, by distillation under reduced pressure. Completion of the reaction can be determined, for example, by measuring the amount of hydrogen added to the pressure vessel to obtain the desired pressure and then, while maintaining the desired pressure, adding hydrogen until the amount required to produce the tetrahydroquinoline compound has been introduced. Again if excess hydrogen is originally added to the pressure vessel and no further hydrogen added the reaction is complete when the pressure remains substantially constant. As will be understood, the temperature and pressure conditions employed can be varied over wide limits. Those given, however, are suitable and can be used to successfully hydrogenate other quinoline compounds to obtain the corresponding tetrahydroquinoline compounds.

ALKYLATION

*Preparation of 1-β,γ-dihydroxypropyl-2-methyl tetrahydroquinoline*

1 gram mole of 2-methyl tetrahydroquinoline, 1.2 gram mole of sodium bicarbonate and 1.2 gram mole of glyceryl chlorohydrin are heated together in a reaction vessel with stirring at 140° C. for five hours. Following completion of the reaction, water is added to the reaction mixture which is then steam distilled to remove any unreacted 2-methyl tetrahydroquinoline. The desired compound is then recovered from the reaction mixture in known fashion and can be used without further purification.

*Preparation of 1-β-hydroxyethyl-2,7-dimethyl tetrahydroquinoline*

1 gram mole of 2,7-dimethyl tetrahydroquinoline is charged into an autoclave and heated at 180° C. with 1.1 gram mole of ethylene oxide for six hours. The reaction mixture is then permitted to cool following which the desired product is recovered by distilling the reaction mixture under reduced pressure.

The corresponding β-hydroxyl propyl compound can be similarly prepared by using propylene oxide in place of ethylene oxide.

*Preparation of 1-sodium β-sulfoethyl-7-chlorotetrahydroquinoline*

1 gram mole of 7-chlorotetrahydroquinoline, 1.1 gram mole of sodium-β-bromoethanesulfonate and 1.1 gram mole of sodium bicarbonate are heated together in a suitable reaction vessel to 120–150° C. for several hours. When no more carbon dioxide is evolved, the reaction mixture is poured into water, steam distilled to remove unreacted 7-chlorotetrahydroquinoline and the remaining solution concentrated to produce crystallization of the desired product.

The phenmorpholine coupling compounds employed in the preparation of the azo compounds of our invention can be prepared by alkylation of the corresponding phenmorpholine compounds which are unsubstituted in the ring nitrogen atom. Alkylation can be carried out in the same manner as described for the tetrahydroquinoline compounds and is illustrated by the following examples.

*Preparation of 1-γ-hydroxypropyl-2-methyl phenmorpholine*

1 gram mole of 2-methyl phenmorpholine is reacted with 1.1 gram mole of trimethylene chlorohydrin and 0.6 gram mole of sodium carbonate in a suitable reaction vessel at 140° C. for five hours. The desired product may be recovered from the reaction mixture by distillation under reduced pressure.

*Preparation of 1-sodium-β-sulfatoethyl-2,7-dimethyl phenmorpholine*

1 gram mole of 1-β-hydroxyethyl-2,7-dimethylphenmorpholine are dissolved in carbon tetrachloride and 1 gram mole of chlorosulfonic acid is added and the reaction conducted without heating; the reaction being completed by warming slightly. Sodium carbonate is then added to the reaction mixture until it is neutral to Congo red paper. The carbon tetrachloride may be largely removed by distillation following which the desired produce can be obtained by crystallization on evaporation of the remaining carbon tetrachloride.

Additional information regarding the preparation of phenmorpholine compounds is to be found in McNally and Dickey U. S. Patent No. 2,196,222, issued April 9, 1940. Similarly, additional information concerning the preparation of tetrahydroquinoline compounds will be found in Dickey and McNally application Serial No. 306,201, filed November 25, 1939.

The amines from which the diazonium compounds of our invention are obtained can be prepared by methods known to those skilled in the art. Any suitable method can be used for their preparation. Information regarding their preparation can be found in McNally and Dickey U. S. Patent No. 2,261,175, issued November 4, 1941, and McNally and Dickey U. S. Patent No. 2,251,947, issued August 12, 1941.

The azo compounds of our invention are, for the most part, relatively insoluble in water and, accordingly, they can be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

This application is a continuation-in-part of our application Serial No. 309,688, filed December 16, 1939 (now United States Patent 2,251,947, dated August 12, 1941).

We claim:
1. The azo dye compounds having the formula:

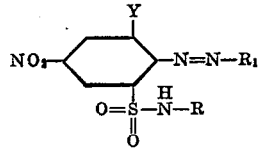

wherein Y stands for a member selected from the group consisting of hydrogen and a nitro group, R stands for a low carbon group selected from the group consisting of low carbon alkyl groups, low carbon hydroxyalkyl groups, low carbon alkoxyalkyl groups and low carbon alkenyl groups, and $R_1$ stands for a residue selected from the group consisting of a 1-alkyl-2-monoalkyltetrahydroquinoline joined through the carbon atom in its 6-position to the azo linkage and a 1-hydroxyalkyl - 2 - monoalkyltetrahydroquinoline joined through the carbon atom in its 6-position to the azo linkage.

2. The azo dye compounds having the formula:

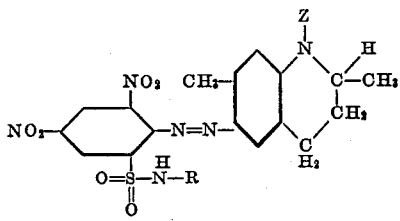

wherein R stands for a low carbon alkyl group and Z stands for a $\beta,\gamma$-dihydroxypropyl group.

3. The azo dye compounds having the formula:

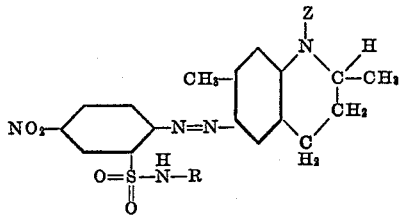

wherein R stands for a low carbon alkyl group and Z stands for a $\beta,\gamma$-dihydroxypropyl group.

4. The azo compound having the formula:

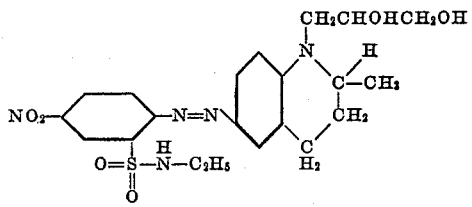

5. The azo compound having the formula:

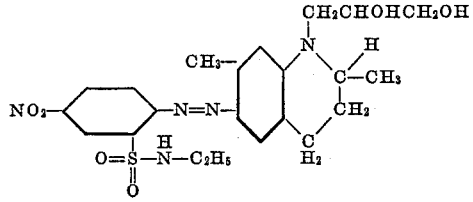

6. The azo compound having the formula:

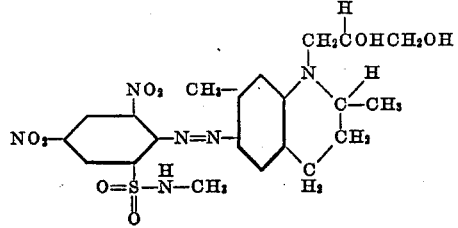

JOSEPH B. DICKEY.
JAMES G. McNALLY.